Patented Feb. 7, 1950

2,496,640

UNITED STATES PATENT OFFICE 2,496,640

FAT LIQUORING AND ALUM TANNING

Bernhardt Schiller, Hillside, and Ralph M. Beach, Florham Park, N. J., assignors to Nopco Chemical Company, Harrison, N. J., a corporation of New Jersey No Drawing. Application May 18, 1944, Serial No. 536,194

11 Claims. (Cl. 8—94.29)

The present invention relates to a process and product for the treatment of hides and skins.

During the processing of various types of hides and skins in order to produce leather and/or suitable fur pelts, the various steps usually employed include the preliminary soaking and fleshing of the hides and skins, followed by pickling, tanning, neutralizing, and washing, then fat liquoring to lubricate the fibers and reduce the cohesion thereof, and various finishing steps.

The present invention relates particularly to the fat liquoring of leather. It has been difficult to obtain in this step, a thorough penetration of oil into the leather. This is particularly true since the various types of emulsions used in fat liquoring subsequent to ordinary tanning processes are not compatible with, or stable in the presence of, the various ingredients used for tanning and/or pickling.

This problem has been particularly marked in the fat liquoring of shearlings, furs, etc. which are preferably subjected to an alum tan for preservation and fixing of the hair. In the alum tanning process, it is desirable that the alum remain in the skin after the tanning proper, inasmuch as the efficiency of the tanning process is greatly enhanced if the alum is allowed to remain in the skin or hide being treated. As a matter of fact, it was common during tanning processes employed in the early days of the art to store the skins for a considerable period of time subsequent to tanning in order that the alum be allowed to combine with the protein matter of the skin in a thorough manner. It is understandable that the storage of skins for a substantial period of time has not been employed recently, since the amount of capital investment thus tied up is very substantial. It has therefore been the practice in modern processes to wash the skins, which removes some alum, and also to neutralize the same prior to fat liquoring or, in the alternative, to hand-oil the skins rather than to fat liquor. Hand-oiling, as may be understood, is a highly expensive process, since the skins have to be treated with a special type of oil, often including materials such as egg yolk, and the process in itself is relatively laborious and time consuming. In addition, the skins are not thoroughly penetrated by the oil, since the oil tends to be concentrated on the back of the skins.

This particular type of process, however, was considered satisfactory because it was not necessary to remove the alum by washing, nor was it necessary to neutralize. Consequently, the skins produced by a process which included hand-oiling were much stronger than those produced by a process which included washing the alum from the skins. Nevertheless, this latter process had to be employed if ordinary fat liquoring emulsions were used, since these emulsions would break down in the presence of any substantial amount of alum and/or pickling ingredients. In general, it was heretofore considered necessary in the art of tanning if fat liquoring was employed, to neutralize and wash the hides or skins thoroughly after tanning, and then fat liquor one or more times, the fat liquoring steps being separated by an interval in which the hides were piled on horses and allowed to stand in order to absorb the oil.

Various proposals have been made which would enable fat liquoring to be successfully carried out in a faster or more economical manner but, in general, the sulfonated oils, etc. used in forming fat liquoring emulsions are not compatible with the usual tanning and/or pickling agents employed. Attempts have also been made to fat liquor and tan in a single operation, but these processes involve special tanning agents or conditions of acidity not conducive to rapid and successful tanning.

It is, therefore, one of the objects of the present invention to provide a novel composition for fat liquoring hides and skins which is stable in the presence of certain tanning and/or pickling ingredients.

A second object of the present invention is the provision of a novel composition for the fat liquoring of hides and skins which is capable of forming a stable emulsion under acid conditions ordinarily encountered during tanning.

A third object of the present invention is to provide a novel process for the combined tanning and fat liquoring of hides and/or skins which will permanently bind a high portion of lubricating ingredients with the fibers of the hides or skins.

A fourth object of the present invention is a novel process for fat liquoring leather which will avoid the necessity of washing the tanning components remaining in the hides and/or skins subsequent to tanning operations.

In accordance with the present invention, fat liquoring compositions which are compatible with certain tanning agents have been discovered. These compositions include cationic surface active bases which are reaction products of certain amino-amides or of glyoxalidines cyclized from those amino-amides. The amino-amides may be best described by the general formula:

where $R^1$ stands for an aliphatic chain of at least 7 carbon atoms; $R^2$ represents a hydrogen atom or 1 to 3 carbon alkylol radical; and $n$ is 2 or 3 when $R^2$ stands for hydrogen and is 1, 2 or 3 when $R^2$ represents an alkylol group. Glyoxalidines may be formed from amino-amides of the above formula by internal condensation wherein the carboxyl carbon atom of the amide group is linked to the nitrogen atom of the nearest amino group in the chain. This glyoxalidine ring formation occurs when the oxygen and hydrogen atoms of the amido group combine with a hydrogen atom of the nearest amino group thereby liberating a molecule of water.

With the foregoing base, various types of oils ordinarily used in tanning together with blown oils and/or esters are preferably admixed, and the resultant fat-liquoring composition may be added to treatment baths in the proportions of from 1% to 25%, depending on the type of leather being made.

It has further been discovered that not only is a fat liquor composition of the aforementioned type compatible with alum, salt and various other pickling and tanning agents, including chrome and aldehyde agents, which are hereinafter termed "mineral tanning agents" for want of a better definition; but that surprisingly better penetration and fat liquoring of leather and skins is provided if the fat liquor is added directly to the tanning bath. This is true not only during the process of alum tanning, but also during chrome tanning and certain other types of tannage. It thus becomes possible to omit not only the step of washing after tanning, but also the separate fat liquoring step. Further, the finished leathers and/or skins which have been treated in accordance with the present invention show increased tensile strength and have a better appearance and feel than similar leathers and/or skins treated in the conventional manner.

Apart from the foregoing composition, the present invention also embraces a novel process of tanning hides and skins which comprises subjecting hides or skins to the action of an aqueous alum salt tanning solution, adding the acid-stable fat-liquoring composition of the invention thereto and finally neutralizing the tanning agent, i. e., raising the pH of the solution whereby the alum precipitates. It is highly preferred to carry out the three essential steps of the tanning and fat-liquoring process in a single drum although, if desired, the hides and skins may be transferred in the various stages of the process to different vessels without, however, washing the hides or skins between the tanning and fat-liquoring stages. By subjecting the hides and skins to the conjoint action of the alum tanning solution and the fat-liquoring composition, each enhances the action of the other. The step of neutralizing the alum serves the purpose of fixing the alum within the leather in the usual manner. In the present process the neutralizing step follows the fat-liquoring operation whereby the fat is also locked in the leather along with the alum.

In general, emulsions formed with the aforementioned base material are stable and highly effective for fat liquoring hides and skins at pH's below 5 to 5.5 and particularly effective for fat liquoring at normal pH's of tanning, i. e. about 2.8 to 3.2 for chrome tanning and 2.6 to 4 for alum tanning.

In preparing the base compound which acts as an emulsifying agent in the fat liquoring compositions of the present invention, a suitable fat or fatty acid is reacted with a polyalkylene polyamine compound in order to form an amino-amide or, in the alternative, the fatty acid or fat is reacted with an alkylene alkylol polyamine or a polyalkylene alkylol polyamine compound. Suitable substances for use in the present invention may be prepared by the processes set forth in U. S. Patent 1,947,951. Thereafter, the amino-amide may be heated to a relatively high temperature to drive off water in order to form a cyclic compound. The amino-amide, or the cyclic compound equivalent to the amino-amide, may then be treated with an agent rendering the compound water soluble such as a suitable acid ester of a mineral acid, for example diethyl sulphate, triethyl phosphate, ethyl iodide, or an aliphatic monocarboxylic acid of from 1 to 3 carbon atoms such as acetic, formic, glycolic, etc. Preferably, the amino-amide or cyclic compound is treated with a suitable sulfuric acid ester, as, for example, diethyl sulfate, dimethyl sulfate, or dipropyl sulfate in order to produce the alkylated derivative of the amino-amide or glyoxalidine. Diethyl sulfate is considered the best alkylating agent. In its preferred general form, the base compound of the present invention may be illustrated by the formula:

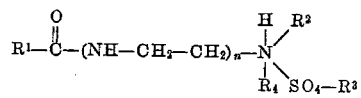

where $R^1$ stands for any saturated or unsaturated aliphatic chain containing 7 to 17 carbon atoms and preferably derived from a fatty acid or naturally occurring fatty glyceride; $R^2$ represents a hydrogen atom or 1 to 3 carbon alkylol group; $R^3$ and $R^4$ each denotes a methyl or ethyl group; $n$ is 2 or 3 when $R^2$ stands for hydrogen and is 1, 2 or 3 when $R^2$ represents an alkyiol radical; and where the formula also encompasses alkylated glyoxalidines produced from the amino-amides prior to the alkylation reaction by liberation of the hydrogen and oxygen atoms of the amido group combined with one hydrogen atom from the nearest amino group whereby the carbon atom of the amido group is linked to the nitrogen atom of the nearest amino group.

Although alkylation with the sulfate ester is shown in the general formula as occurring only at the end nitrogen atom, it appears that lesser amounts of the ester become attached to all other nitrogens except the amido nitrogen atom and its counterpart in the cyclic product. However, it is believed that the sulfate radical attached to the end nitrogen atom is predominantly effective in rendering the base compound soluble in water.

In general, temperatures in the neighborhood of 200° C. or from 180 to 210° C. are utilized for the amidification, and in the event the cyclic compound is desired, temperatures in the neighborhood of 300° C. are used. In the subsequent solubilizing treatment of the amino-amide or its cyclic equivalent, the reacting components are preferably cooled so that the temperature does not exceed approximately 60° C. Various polyalkylene polyamine, alkylene alkylol polyamine or polyalkylene alkylol polyamine compounds having from 2 to 4 amino groups may be used, as, for example, diethylene triamine, ethanol ethylene diamine, ethanol diethylene triamine, triethylene tetramine, etc. Almost any fatty acid or fatty acid glyceride having from 8 to 24 carbon atoms in the chain may be utilized as the fatty acid portion of the compound. Thus, oleic acid, ricinoleic acid, lauric acid, stearic acid, palmitic acid, etc. are examples of the fatty acids which may be utilized in preparing the base compound of the present invention. Mixtures of these acids and their glycerides naturally occurring in various types of vegetable oils, fish oils, animal oils, and the like may also be utilized. Various propor-

EXAMPLE V

A properly prepared skin was tanned in a 2% chrome solution for 24 hours. After tanning, the leather was fat liquored in a 2% solution of the fat liquoring composition of Example III at pH 3.5 for 3 hours. Half of the fat liquored skin was pressed at 5000 pounds per square inch (to remove all free oil), the other half was merely allowed to dry. The dried leather was analyzed for free and combined oil.

Table I
[Extracted with petroleum ether]

| | Per cent oil (dry basis) |
|---|---|
| Pressed leather (considered loosely bound oil) | 1.15 |
| Unpressed leather (total oil by ether extraction) | 1.52 |
| Completely free oil | 0.37 |

Table II
[Extracted with ethyl alcohol after petroleum ether extraction to give solidly bound oil]

| | Per cent oil |
|---|---|
| Pressed leather | 1.23 |
| Unpressed leather | 1.24 |

Table III
[Combination of Tables I and II]

| | Per cent oil |
|---|---|
| Free oil | 0.37 |
| Loosely bound oil | 1.15 |
| Solidly bound oil | 1.24 |
| Total oil | 2.76 |

EXAMPLE VI

A properly prepared skin was chrome tanned in a similar manner to that described in Example V, with the exception that the fat liquoring composition of Example III was added during the chrome tannage. Half of the leather was pressed, the other half unpressed.

Table IV
[Petroleum ether extraction]

| | Per cent oil |
|---|---|
| Pressed leather (loosely bound oil) | 4.17 |
| Unpressed leather (total oil by ether extraction) | 13.95 |
| Completely free oil | 9.78 |

Table V
[Extracted with ethyl alcohol after petroleum ether extraction to give solidly bound oil]

| | Per cent oil |
|---|---|
| Pressed leather | 2.82 |
| Unpressed leather | 3.21 |
| Av. | 3.01 |

Table VI
[Combination of Tables IV and V]

| | Per cent oil |
|---|---|
| Free oil | 9.78 |
| Loosely bound oil | 4.17 |
| Solidly bound oil | 3.01 |
| Total oil take up | 16.96 |

EXAMPLE VII

A properly prepared skin was placed in a 2% formaldehyde solution at pH 5.5 for 24 hours with constant shaking. After this period, the solution was adjusted to pH 4 and approximately 6% of the fat liquoring composition of Example III was added and thereafter the solution and skin were shaken for an additional 24 hours. The fat liquored and tanned sample was then removed. Part of the sample was pressed at 5000 pounds per square inch in order to remove all of the uncombined oil. After drying, the samples were extracted with a solvent to remove the combined oil. The following data were obtained:

| | Per cent |
|---|---|
| Entirely free oil | 5.52 |
| Bound oil | 4.16 |
| Total oil taken up | 9.68 |

The tanned and fat liquored leather had an excellent feel and tensile strength.

EXAMPLE VIII

To 38 grams of the glyoxalidine compound of Example I, 16 grams of ethyl iodide were slowly added at room temperature. The mixture was cooled during the addition and maintained below 60° C. Thereafter the mixture was stirred for two hours while cooling. The resultant product was believed to have the following structural formula:

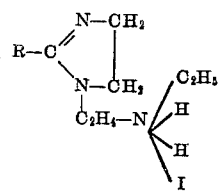

30% of the above compound was added to 30% of a blend of 50–50 blown mustardseed oil and butyl oleate and 40% of 28° Bé. paraffin oil to produce a fat liquoring composition.

EXAMPLE IX

To 38 grams of the glyoxalidine compound of Example I, 6 grams of glacial acetic acid were added and reacted in a manner similar to the procedure of Example I. The resultant product was believed to have the following structural formula:

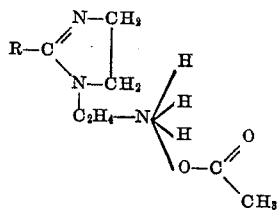

30% of the above compound was added to 30% of a blend of 50–50 blown mustardseed oil and butyl oleate and 40% of 28° Bé. paraffin oil to produce a fat liquoring composition.

In all of the above examples, as well as in substantially all tanning baths, the fat liquoring emulsion of the present invention is stable and forms a suitable fat liquoring material. It will be noted that the amount of oil taken up by the leather is greater if the fat liquoring composition is added during tanning (Example VI) than when the fat liquoring composition is added to a separate bath (Example V). In general, the fat liquoring composition is preferably used at a pH value below about 4.5 although, as previously pointed out, pH values up to 5 to 5.5 are suitable in certain instances.

tions of raw oils customarily used for leather treatment such as neat's-foot oil, peanut oil, blown peanut oil, sperm oil, wool grease, herring oil, cod oil, mineral oil, etc. may be combined with the base material in order to form the final composition and such oils are meant when the term "leather treating oil" is used in the present specification and claims.

In general, it is desirable to incorporate in the leather treating composition of the present invention from 5 to 50% of base and the remainder, raw oil or other ingredients. The composition may also include up to 60% of mineral oil which may be desirable in order to effect a more thorough penetration of the leather. It has been found especially suitable to also include within the composition from 5 to 20% of blown oils and from 5 to 20% of a suitable fatty acid ester having the general formula:

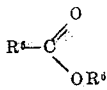

wherein $R^5$ may be any saturated or unsaturated carbon linkage of at least 7 and preferably not over 17 carbon atoms, and $R^6$ an alkyl group having from 1 to 16 carbon atoms. The presence of an ester appears to be particularly desirable where the base compound is of a straight chain rather than a cyclic character. The composition may then be incorporated in a fat liquoring bath or in a tanning bath in various proportions, depending on the desired amount of lubrication.

The following examples serve to illustrate the present invention, but are not intended to in any way limit the same.

EXAMPLE I 78.3 parts by weight of peanut oil and 27.5 parts by weight of diethylene triamine were heated together to a temperature of between 180 and 190° C. and held at this temperature for 20 minutes. Thereafter the reaction mixture was rapidly heated to 300° C. and the evolved water was collected in a moisture trap. When 5.8 parts of aqueous condensate were collected, the heat was shut off and the product allowed to cool. The resultant product was believed to have the following formula:

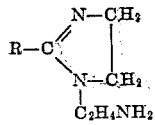

where R represents the residue of the fatty acids in the peanut oil. To 70 parts of the above glyoxalidine compound, 30 parts of diethyl sulfate were added slowly at room temperature. The glyoxalidine was cooled during the addition and the temperature at no time during the addition and subsequent reaction was allowed to exceed 60° C. The reaction mixture was then stirred for two hours while cooling. The resultant product was believed to have the following structural formula:

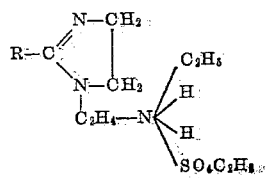

25% of the above compound was mixed with 30% of a 50-50 blend of blown mustard seed oil and butyl oleate and 45% of 28° Bé. paraffin oil. The resultant composition was a clear light amber oil which produced a transparent opalescent emulsion in almost any concentration which was stable in the presence of 10% salt and 20% alum, or in any combination of salt and alum of the above concentrations.

EXAMPLE II

Twenty per cent of the base compound of Example I was mixed with 35% of sperm oil and 45% of blown peanut oil. The resultant fat liquoring composition was equally stable, as compared to the composition of Example I, in salt and alum solutions and was a particularly desirable fat liquoring material for fur treatment.

EXAMPLE III

Seventy-three parts by weight of red oil (oleic acid) and 27 parts of ethanol ethylene diamine were heated together to 200° C. for from 2 to 3 hours or until the reaction was complete to form the corresponding amino amide of the oleic acid. 71 parts of the amide were then warmed to 50° C. and 29 parts of diethyl sulfate added slowly thereto while cooling, so that the temperature did not exceed 60° C. The mixture was then stirred for two hours and then allowed to stand at room temperature for from 6 to 7 days in order to complete the formation of the alkylation product of the amino-amide. The resultant product is believed to have the following formula:

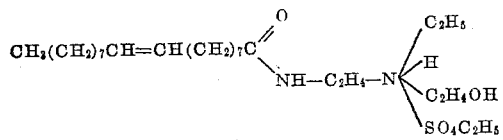

30% of the above compound was added to 30% of a blend of 50-50 blown mustard seed oil and butyl oleate and 40% of 28° Bé. paraffin oil. The resultant fat liquoring composition made a transparent opalescent emulsion in 10% salt and/or 20% alum. This fat liquoring composition was entirely suitable for fat liquoring skins and hides either in a separate bath or when added directly to the tanning bath, as will be hereinafter set forth.

EXAMPLE IV

Properly prepared Indian lambskins were placed in a tanning liquor containing 10 lbs. of ammonium alum, 10 lbs. of sodium chloride, 1 lb. sal ammoniac, and 2½ lbs. sal soda per 100 liters, 2 liters of the solution being used for each skin. The pH of the tanning liquor was 3.7. The skins were drummed 1 hr. and then 50 cc. per skin of a fat liquoring composition produced by mixing 60% of the fat liquoring composition of Example II with 20% sperm oil, 10% neat's-foot oil and 10% blown fish oil were added. The skins were then drummed for 2 more hours and allowed to stand overnight. In the morning, the skins were drummed for 1 more hour and the pH was brought up by the addition of sodium bicarbonate until the alum began to precipitate (pH about 4). The skins were removed and hung up to dry, and thereafter finished in the usual manner. The resultant skins had a desirable feel and stretch fully equal to those processed in the conventional manner which included hand-oiling, etc. and possessed superior tensile strength.

The present fat liquoring composition differs from the usual sulphonated oils, etc. in that the present base is cation active, whereas sulphonated oils are anion active. It is, therefore, not desirable to use the present fat liquoring composition with such materials so sulphonated oils. However, the fat liquoring composition is entirely stable and as previously stated is preferably used with tanning and/or pickling agents. Raw leather such as hides, skins and the like will, for the purposes of brevity, be generically connoted as "skin" or "skins" in the appended claims.

Throughout the present specification and claims, except where otherwise specified, the various percentages are by weight.

Having described our invention, what we claim as new and desire to secure by Letters Patent is:

1. A novel process of tanning which comprises subjecting a skin to the action of an aqueous alum salt tanning solution, then subjecting the skin to the action of an acid-stable fat liquoring composition in chemical emulsion in said tanning agent solution, said fat liquoring composition comprising a leather treating oil and a cationic surface active base compound selected from the group consisting of derivatives alkylated with a dialkyl sulfate, containing a total of from 2 to 4 carbon atoms, of amino-amides having the general formula:

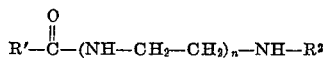

wherein R' denotes an aliphatic chain containing at least 7 carbon atoms, $R^2$ represents a 1 to 3 carbon alkylol radical and $n$ is 1, 2 or 3, and finally raising the pH value of the solution to effect precipitation of alum.

2. A novel process of tanning which comprises drumming a skin in an aqueous alum salt tanning solution, adding an acid-stable fat liquoring composition to the drum to form a chemical emulsion thereof in said tanning solution, said fat liquoring composition comprising a leather treating oil and a cationic surface active base compound selected from the group consisting of derivatives alkylated with a dialkyl sulfate, containing a total of from 2 to 4 carbon atoms, of amino-amides having the general formula:

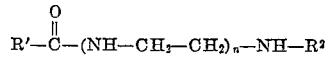

wherein R' denotes an aliphatic chain containing at least 7 carbon atoms, $R^2$ represents a 1 to 3 carbon alkylol radical and $n$ is 1, 2 or 3, drumming the skin to complete the tanning and fat liquoring thereof and then raising the pH value of the solution to effect precipitation of alum.

3. A novel process of tanning which comprises subjecting a skin to the action of an aqueous alum salt tanning solution, then subjecting the skin to the action of an acid-stable fat liquoring composition in chemical emulsion in said tanning agent solution, said fat liquoring composition comprising a leather treating oil and a surface active amino-amide having the general formula:

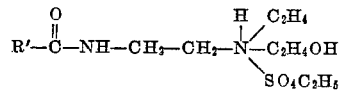

wherein R' denotes an aliphatic chain containing at least 7 carbon atoms, and finally raising the pH value of the solution to effect precipitation of alum.

4. A novel process of tanning which comprises drumming a skin in an aqueous alum salt tanning solution, adding an acid-stable fat liquoring composition to the drum to form a chemical emulsion thereof in said tanning solution, said fat liquoring composition comprising a leather treating oil and a surface active amino-amide having the general formula:

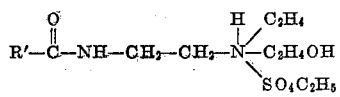

wherein R' denotes an aliphatic chain containing at least 7 carbon atoms, drumming the skin to complete the tanning and fat liquoring thereof and then raising the pH value of the solution to effect precipitation of alum.

5. A novel process of tanning which comprises drumming a skin in an aqueous alum-salt tanning solution, adding an acid-stable fat liquoring composition to the drum to form a chemical emulsion thereof in said tanning solution, said fat liquoring composition comprising a leather treating oil and a surface active amino-amide having the general formula:

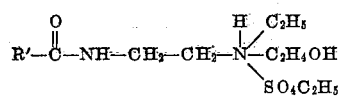

wherein R' denotes an aliphatic chain containing from 7 to 17 carbon atoms, drumming the skin to complete the tanning and fat liquoring thereof and finally raising the pH of the tanning solution to effect precipitation of alum.

6. An acid-stable fat liquoring composition for hides and skins which comprises a leather treating oil in sufficient amount to fat liquor leather and from 5 to 50% by weight of a cationic surface active base compound selected from the group consisting of derivatives alkylated with a dialkyl sulfate containing a total of from 2 to 4 carbon atoms of amino-amides having the general formula:

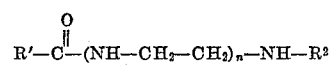

wherein R' denotes an aliphatic chain containing at least 7 carbon atoms, $R^2$ represents a 1 to 3 carbon alkylol radical and $n$ is 1, 2 or 3, said composition being characterized by forming a stable emulsion in conventional aqueous mineral tanning solutions.

7. The fat-liquoring composition of claim 6 wherein the leather treating oil is a blend of a fatty oil, mineral oil and a monohydric alcohol ester of a higher fatty acid.

8. An acid-stable fat liquoring composition for hides and skins which comprises a leather treating oil in sufficient amount to fat liquor leather and from 5 to 50% of a surface active amino-amide having the general formula:

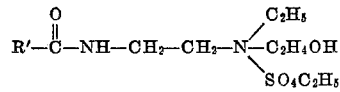

wherein R' denotes an aliphatic chain containing from 7 to 17 carbon atoms, said composition being characterized by forming a stable emulsion in conventional aqueous mineral tanning solutions.

9. The fat liquoring composition of claim 8 wherein the leather treating oil is a blend of a fatty oil, mineral oil and a monohydric alcohol ester of a higher fatty acid.

10. The fat liquoring composition of claim 8 wherein the leather treating oil is a blend of a fatty oil and a mineral oil.

11. The fat liquoring composition of claim 8 wherein the leather treating oil is a blend of a blown fatty oil, a mineral oil and a monohydric alcohol ester of a higher fatty acid.

BERNHARDT SCHILLER.
RALPH M. BEACH.

REFERENCES CITED

The following references are of record in the file of this patent:

UNITED STATES PATENTS

| Number | Name | Date |
|---|---|---|
| 169,102 | Hart | Oct. 26, 1875 |
| 1,737,458 | Hartmann | Nov. 26, 1929 |
| 1,779,012 | Rewald | Oct. 21, 1930 |
| 1,883,042 | Somerville | Oct. 18, 1932 |
| 1,891,363 | Rohm | Dec. 20, 1932 |
| 1,924,698 | Neelmeier | Aug. 29, 1933 |
| 2,115,562 | Orthmann | Apr. 26, 1938 |
| 2,176,434 | Niedercorn | Oct. 17, 1939 |
| 2,229,976 | Kaplan | Jan. 28, 1941 |
| 2,267,965 | Wilson | Dec. 30, 1941 |
| 2,347,712 | Robinson | May 2, 1944 |

FOREIGN PATENTS

| Number | Country | Date |
|---|---|---|
| 308,386 | Germany | Oct. 12, 1918 |
| 640,535 | France | Apr. 2, 1928 |
| 337,524 | Great Britain | Nov. 6, 1930 |
| 557,203 | Germany | Aug. 19, 1932 |
| 416,309 | Great Britain | Dec. 5, 1932 |
| 596,576 | Germany | May 5, 1934 |
| 796,917 | France | Feb. 3, 1937 |
| 693,373 | Germany | July 6, 1940 |
| 698,742 | Germany | Nov. 16, 1940 |

OTHER REFERENCES

"Principles of Leather Manufacture," by H. R. Proctor; D. Van Nostrand Co., N. Y. C., 2nd ed. 1922, pages 247–252.

"Chemistry of Leather Manufacture," by J. A. Wilson; Chemical Catalog Co., N. Y. C., 2nd ed., 1929, vol. 2, page 817.

"Chemistry of Leather Manufacture," by McLaughlin and Theis, Reinhold Pub. Corp., N. Y. C., 1945, pages 738–746.

"Manufacture of Leather," by C. T. Davis, H. C. Baird & Co., Phila., Pa., 1885, pages 653–659.